（12）United States Patent
Lee

(10) Patent No.: US 11,745,106 B2
(45) Date of Patent: Sep. 5, 2023

(54) METHOD AND SYSTEM FOR CONTROLLING MOVEMENT OF BALL IN SPORTS GAME

(71) Applicant: GAMEVIL INC., Seoul (KR)

(72) Inventor: Dong Won Lee, Seoul (KR)

(73) Assignee: Com2uS Holdings Corporation, Seoul (KR)

( * ) Notice: Subject to any disclaimer, the term of this patent is extended or adjusted under 35 U.S.C. 154(b) by 633 days.

(21) Appl. No.: 16/876,945

(22) Filed: May 18, 2020

(65) Prior Publication Data

US 2020/0376384 A1   Dec. 3, 2020

(30) Foreign Application Priority Data

Jun. 3, 2019   (KR) .......................... 10-2019-0065192

(51) Int. Cl.
*A63F 13/573*   (2014.01)
*A63F 13/812*   (2014.01)
*A63F 13/2145*   (2014.01)

(52) U.S. Cl.
CPC ........ *A63F 13/573* (2014.09); *A63F 13/2145* (2014.09); *A63F 13/812* (2014.09);
(Continued)

(58) Field of Classification Search
CPC .. A63F 13/573; A63F 13/812; A63F 13/2145; A63F 2300/8011; A63F 2300/1075
See application file for complete search history.

(56) References Cited

U.S. PATENT DOCUMENTS 5,435,554 A * 7/1995 Lipson .................. A63F 13/245
463/3
8,033,914 B2 * 10/2011 Yoshikawa ............. A63F 13/26
463/31
(Continued)

FOREIGN PATENT DOCUMENTS

JP   2001104640 A   *   4/2001
JP   2009142510 A       7/2009
(Continued)

OTHER PUBLICATIONS

"98 Koshien Best Baseball Pitching EVER," Published 2012. source: https://www.reddit.com/r/GamePhysics/comments/15ywh3/98_koshien_best_baseball_pitching_ever/ (Year: 2012).*
(Continued)

*Primary Examiner* — Steven J Hylinski
(74) *Attorney, Agent, or Firm* — CHRISTENSEN O'CONNOR JOHNSON KINDNESS PLLC

(57) ABSTRACT

Disclosed are a method and system for controlling a movement of a ball in a sports game. A control method may include providing a customizing function enabling a user to generate a skill for a preset section by customizing at least one of the speed, trajectory and effect of a ball moving in the preset section in a sports game, storing at least one of the customized speed, trajectory and effect in association with the skill generated through the customizing function, and controlling a movement of the ball in the section using at least one of the speed, trajectory and effect stored in association with the activated skill in response to an activation of the skill for the section in a process in which a game instance for the sports game proceeds.

16 Claims, 9 Drawing Sheets

(52) U.S. Cl.
 CPC ............... *A63F 2300/1075* (2013.01); *A63F 2300/8011* (2013.01)

(56) References Cited

U.S. PATENT DOCUMENTS

| | | | | |
|---|---|---|---|---|
| 8,202,147 | B2* | 6/2012 | Yamada | A63F 13/56 463/31 |
| 9,358,457 | B2* | 6/2016 | Takeda | A63F 13/211 |
| 10,471,330 | B1* | 11/2019 | Hart | A63B 69/406 |
| 2005/0077676 | A1* | 4/2005 | Long, Jr. | A63F 3/00697 273/244.1 |
| 2005/0153761 | A1* | 7/2005 | Sterchi | A63F 13/812 463/3 |
| 2009/0170579 | A1* | 7/2009 | Ishii | A63F 13/44 463/2 |
| 2022/0054922 | A1* | 2/2022 | Yang | A63B 71/0622 |

FOREIGN PATENT DOCUMENTS

| | | | |
|---|---|---|---|
| JP | 2010088562 A * | 4/2010 | |
| JP | 2017136125 A | 8/2017 | |
| JP | 2020028342 A * | 2/2020 | |
| KR | 10-2013-0040391 | 4/2013 | |
| KR | 10-2019-0035506 B1 | 4/2019 | |
| WO | WO-2015087640 A1 * | 6/2015 | ......... A63F 13/2145 |

OTHER PUBLICATIONS

"98 Koshien NTSC-J", accessed Dec. 16, 2022. Source:https://psxdatacenter.com/games/J/0-9/SLPS-01204.html (Year: 2022).*
"98 Koshien Gameplay and Commentary," by penguinz0, published May 20, 2011. Source:https://www.youtube.com/watch?v=gbYYJF0c4VA (Year: 2011).*
"Crazy High School Baseball Players," by con1987. Published Apr. 18, 2008. Source:https://www.youtube.com/watch?v=7gjfZABX8Kw (Year: 2008).*
"MLB 19 Batting Stance/Pitching Delivery Edits," by The Kid 24, published Mar. 26, 2019. Source:https://forums.operationsports.com/forums/mlb-show-rosters/949118-mlb-19-batting-stance-pitching-delivery-edits.html (Year: 2019).*
"Rather Unique Pitching Strategies in 98 Koshien, a Japanese Baseball Game." by u/scientologiest2. Published 2011. Source:https://www.reddit.com/r/gaming/comments/i4w5y/rather_unique_pitching_strategies_in_98_koshien_a/ (Year: 2011).*
"Weirdness that is 98 Koshien," by Buckeye, published Apr. 5, 2012. Source:https://fandompost.vbulletin.net/blogs/buckeye/622651- (Year: 2012).*
"Target 2011 Professional Baseball League my own 2011 baseball hits", <https://blog.naver.com/PostPrint.nhn?blogId=jun0312a&logNo=30118909449>, retrieved on Sep. 25, 2020, 5 pages.
Office Action dated Oct. 20, 2020, in corresponding Korean application No. 10-2019-0065192 (Korean version), filed Jun. 3, 2019, 6 pages.
Office Action dated Jun. 8, 2021, in corresponding Japanese application No. 2020-082249 (Japanese version), 2 pages.

* cited by examiner

METHOD AND SYSTEM FOR CONTROLLING MOVEMENT OF BALL IN SPORTS GAME

CROSS REFERENCE TO RELATED APPLICATION

This application is based on and claims priority under 35 U.S.C. 119 to Korean Patent Application No. 10-2019-0065192, filed on Jun. 3, 2019, in the Korean Intellectual Property Office, the disclosures of which is herein incorporated by reference in their entireties.

BACKGROUND OF THE INVENTION

Field of the Invention

The following description relates to a method and system for controlling a movement of a ball in a sports game.

Related Art

A sports game is a game using sports as a subject matter, and is divided into an action game genre and a simulation game genre. However, the sports game itself tends to be classified as a separate genre. Particularly, games for competing for techniques for handling balls, such as baseball, soccer, handball, volleyball, and basketball, include sports games for ball games. For example, Korean Patent Application Laid-Open No. 10-2013-0040391 relates to a pitching method and system in a baseball game, and discloses that pitching is performed toward the position of a pitch based on the speed of a ball and a ball control probability set based on at least one of a pitcher character and ball quality.

SUMMARY OF THE INVENTION

Provided are a control method capable of providing a function which enables a user to generate a skill for a preset section by customizing the speed, trajectory and/or effect of a ball moving in the preset section in a sports game and of controlling a movement of the ball in the preset section based on the customized speed, trajectory and/or effect in response to the activation of the skill generated through the function when a sports game instance is performed, a computer apparatus performing the control method, a computer program stored in a computer-readable recording medium in order to execute the control method in a computer apparatus in association with the computer apparatus, and a recording medium for the computer program.

In an embodiment, a control method performed by a computer apparatus including at least one processor includes providing, by the at least one processor, a customizing function enabling a user to generate a skill for a preset section by customizing at least one of the speed, trajectory and effect of a ball moving in the preset section in a sports game, storing, by the at least one processor, at least one of the customized speed, trajectory and effect in association with the skill generated through the customizing function, and controlling, by the at least one processor, a movement of the ball in the section using at least one of the speed, trajectory and effect stored in association with the activated skill in response to an activation of the skill for the section in a process in which a game instance for the sports game proceeds.

According to one aspect, providing the customizing function may include providing a sector speed setting function for setting a speed of the ball in each of a plurality of sectors split from the section. Controlling the movement of the ball may include controlling, in each of the plurality of sectors, the speed of the ball moving in the section based on the speed of the ball in each of the plurality of sectors set through the sector speed setting function in response to the activation of the skill.

According to another aspect, providing the customizing function may include providing a trajectory setting function for setting the trajectory of the ball in the section based on an output value of a motion sensor included in the computer apparatus. Controlling the movement of the ball may include controlling the trajectory of the ball moving in the section based on the trajectory set through the trajectory setting function in response to the activation of the skill.

According to yet another aspect, providing the customizing function may include providing an effect selection function for selecting one of a plurality of effects fabricated in a preset form. Controlling the movement of the ball may include applying an effect, selected through the effect selection function, to the ball moving in the section in response to the activation of the skill.

According to yet another aspect, providing the customizing function may include providing a sector speed setting function for setting a speed of the ball in each of a plurality of sectors split from the section and a trajectory setting function for setting the trajectory of the ball in the section. A total movement time of the ball in the section may be calculated based on the speed of the ball in each of the plurality of sectors set through the sector speed setting function. A change in the trajectory for each time zone may be set by dividing the trajectory of the ball, set through the trajectory setting function, by each time zone corresponding to the total movement time of the ball. Controlling the movement of the ball may include controlling the movement of the ball in the section based on the change in the trajectory for each time zone in response to the activation of the skill.

According to yet another aspect, the sports game may include a baseball game. The preset section may include a section in which pitching and catching are performed between a pitcher and a catcher in the baseball game.

According to yet another aspect, the customizing function may include a preview function for displaying an image of the ball moving in the section based on at least one of the speed, trajectory and effect of the ball set through the customizing function.

According to yet another aspect, the customizing function may further include a sharing function for capturing at least one of frames configuring the image displayed through the preview function and sharing the captured frame through a social network service. A trajectory of the ball moving in the section may be displayed in each of the frames. The control method may further include selecting the at least one of the frames based on the trajectories of the ball displayed in the frames when the sharing function is executed.

In an embodiment, there is provided a non-transitory processor-readable medium having instructions stored thereon, which when executed by one or more processors, cause the one or more processors to implement the method.

In an embodiment, there is provided a computer apparatus including at least one processor implemented to execute instructions readable by a computer. The at least one processor provides a customizing function enabling a user to generate a skill for a preset section by customizing at least one of the speed, trajectory and effect of a ball moving in the preset section in a sports game, stores at least one of the customized speed, trajectory and effect in association with the skill generated through the customizing function, and controls a movement of the ball in the section using at least one of the speed, trajectory and effect stored in association with the activated skill in response to an activation of the skill for the section in a process in which a game instance for the sports game proceeds.

DESCRIPTION OF EXEMPLARY EMBODIMENTS

Hereinafter, embodiments are described in detail with reference to the accompanying drawings.

A control method according to various embodiments of the present invention may be implemented by at least one computer apparatus. A computer program according to an embodiment of the disclosure may be installed and driven in the computer apparatus. The computer apparatus may perform the control method according to an embodiment of the disclosure under the control of a driven computer program. The computer program may be stored in a computer-readable recording medium coupled to the computer apparatus in order to execute the control method in the computer apparatus.

Figure 1:
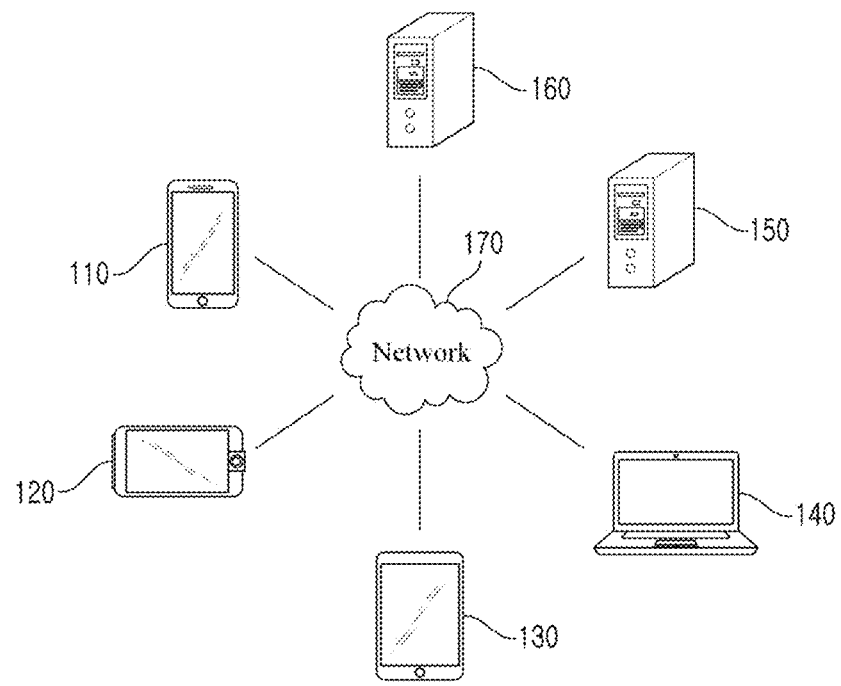
FIG. 1 is a diagram illustrating an example of a network environment according to an embodiment of the present invention.

FIG. 1 is a diagram illustrating an example of a network environment according to an embodiment of the present invention. In FIG. 1, the network environment illustrates an example including a plurality of electronic devices 110, 120, 130 and 140, a plurality of servers 150 and 160, and a network 170. FIG. 1 is an example of a description of the disclosure, and the number of electronic devices or the number of servers is not limited like FIG. 1. Furthermore, the network environment of FIG. 1 illustrates only one of environments which may be applied to the present embodiments, and an environment applicable to the present embodiments is not limited to the network environment of FIG. 1.

The plurality of electronic devices 110, 120, 130 and 140 may be stationary devices or mobile devices implemented as computer apparatuses. For example, the plurality of electronic devices 110, 120, 130 and 140 may include a smart phone, a mobile phone, a navigator, a computer, a laptop, a terminal for digital broadcasting, a personal digital assistant (PDA), a portable multimedia player (PMP), and a tablet PC. For example, in FIG. 1, an example of a shape of the electronic device 1 (110) is illustrated as being a smartphone. However, in embodiments of the present invention, the electronic device 1 (110) may mean one of various physical computer apparatuses capable of communicating with other electronic devices 120, 130 and 140 and/or the servers 150 and 160 over a network 170 substantially using a wireless or wired communication method.

A communication method is not limited, and may include short-distance wireless communication between devices in addition to communication methods using communication networks (e.g., a mobile communication network, wired Internet, wireless Internet and a broadcasting network) which may be included in the network 170. For example, the network 170 may include one or more given networks of a personal area network (PAN), a local area network (LAN), a campus area network (CAN), a metropolitan area network (MAN), a wide area network (WAN), a broadband network (BBN), and the Internet. Furthermore, the network 170 may include one or more of network topologies, including a bus network, a star network, a ring network, a mesh network, a star-bus network, and a tree or hierarchical network, but is not limited thereto.

Each of the servers 150 and 160 may be implemented as a computer apparatus or a plurality of computer apparatuses, which provides a command, code, a file, content, or a service through communication with the plurality of electronic devices 110, 120, 130 and 140 over the network 170. For example, the server 150 may be a system that provides a service (e.g., a game service, a messaging service, a mail service, a social network service, a map service, a translation service, a financial service, a settlement service, a search service, or a content provision service) to the plurality of electronic devices 110, 120, 130 and 140 connected thereto over the network 170.

Figure 2:
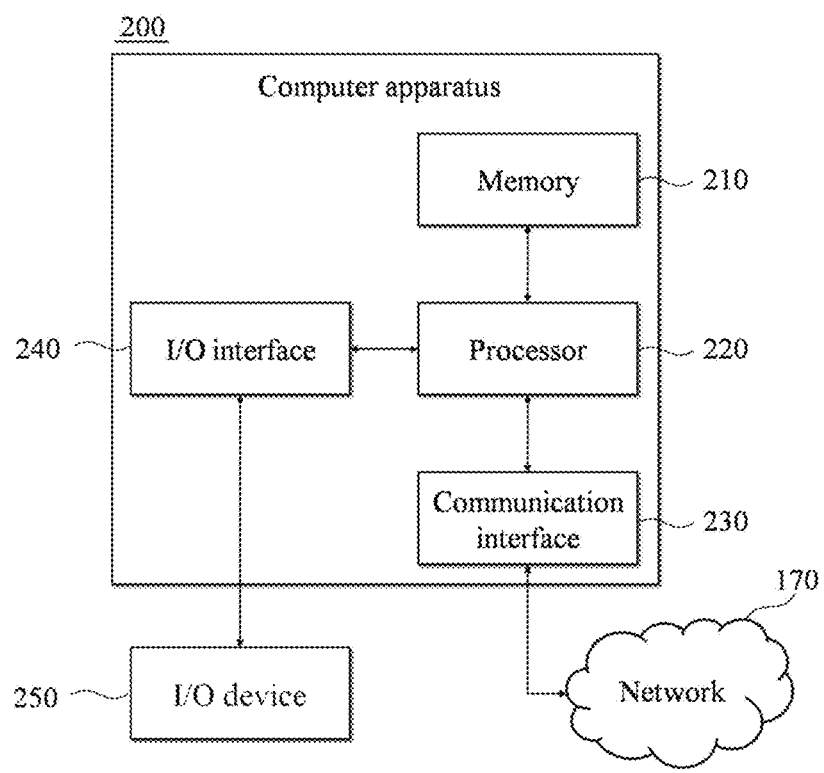
FIG. 2 is a block diagram illustrating an example of a computer apparatus according to an embodiment of the present invention.

FIG. 2 is a block diagram illustrating an example of a computer apparatus according to an embodiment of the present invention. Each of the plurality of electronic devices 110, 120, 130 and 140 or each of the servers 150 and 160 may be implemented by a computer apparatus 200 illustrated in FIG. 2.

As illustrated in FIG. 2, the computer apparatus 200 may include a memory 210, a processor 220, a communication interface 230 and an input/output (I/O) interface 240. The memory 210 is a computer-readable recording medium, and may include permanent mass storage devices, such as a random access memory (RAM), a read only memory (ROM) and a disk drive. In this case, the permanent mass storage device, such as a ROM and a disk drive, may be included in the computer apparatus 200 as a permanent storage device separated from the memory 210. Furthermore, an operating stem and at least one program code may be stored in the memory 210. Such software elements may be loaded from a computer-readable recording medium, separated from the memory 210, to the memory 210. Such a separate computer-readable recording medium may include computer-readable recording media, such as a floppy drive, a disk, a tape, a DVD/CD-ROM drive, and a memory card. In another embodiment, software elements may be loaded onto the memory 210 through the communication interface 230 not a computer-readable recording medium. For example, the software elements may be loaded onto the memory 210 of the computer apparatus 200 based on a computer program installed by files received over the network 170.

The processor 220 may be configured to process instructions of a computer program by performing default arithmetic, logic and I/O operations. The instructions may be provided to the processor 220 by the memory 210 or the communication interface 230. For example, the processor 220 may be configured to execute instructions received according to program code stored in a recording device, such as the memory 210.

The communication interface 230 may provide a function for enabling the computer apparatus 200 to communicate with other devices (e.g., the aforementioned storage devices) over the network 170. For example, a request, a command, data or a file generated by the processor 220 of the computer apparatus 200 based on program code stored in a recording device, such as the memory 210, may be provided to other devices over the network 170 under the control of the communication interface 230. Inversely, a signal, a command, data or a file from another device may be received by the computer apparatus 200 through the communication interface 230 of the computer apparatus 200 over the network 170. A signal, a command or a file received through the communication interface 230 may be transmitted to the processor 220 or the memory 210. A file received through the communication interface 230 may be stored in a storage device (the aforementioned permanent storage device) which may be further included in the computer apparatus 200.

The I/O interface 240 may be means for an interface with an input/output (I/O) device 250. For example, the input device may include a device, such as a microphone, a keyboard, a camera or a mouse. The output device may include a device, such as a display or a speaker. For another example, the I/O interface 240 may be means for an interface with a device in which functions for input and output have been integrated into one, such as a touch screen. The I/O device 250 may be configured as a single device along with the computer apparatus 200.

Furthermore, in other embodiments, the computer apparatus 200 may include elements greater or smaller than the elements of FIG. 2. However, it is not necessary to clearly illustrate most of conventional elements. For example, the computer apparatus 200 may be implemented to include at least some of the I/O device 250 or may further include other elements, such as a transceiver and a database.

Figure 3:
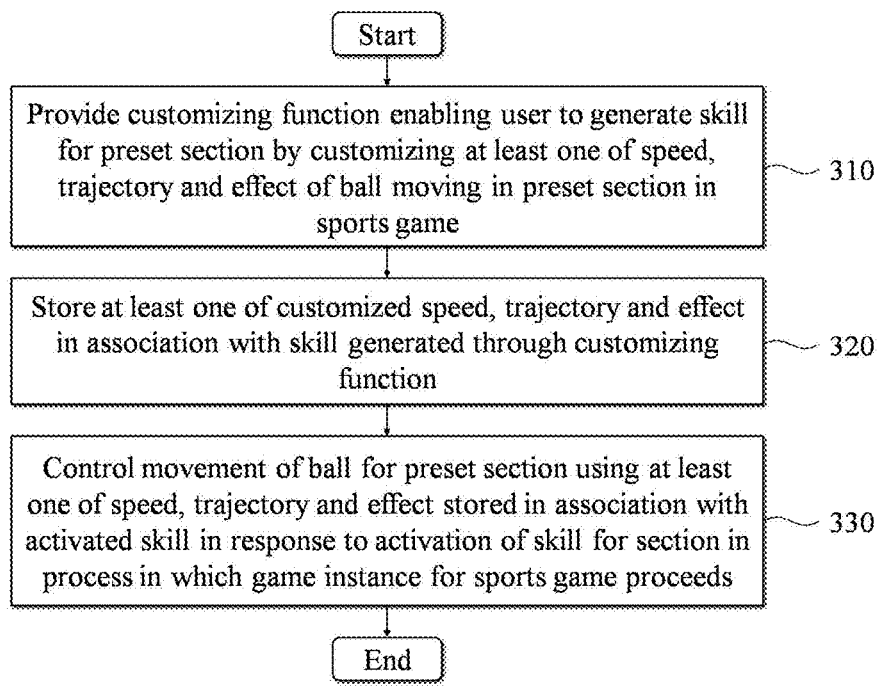
FIG. 3 is a flowchart illustrating an example of a control method according to an embodiment of the present invention.

FIG. 3 is a flowchart illustrating an example of a control method according to an embodiment of the present invention. The gaming method according to the present embodiment may be performed by the computer apparatus 200. For example, the processor 220 of the computer apparatus 200 may be implemented to execute a control instruction based on a code of an operating system or a code of at least one computer program included in the memory 210. In this case, the processor 220 may control the computer apparatus 200 to perform steps 310 to 330 included in the method of FIG. 3 in response to a control instruction provided by a code stored in the computer apparatus 200. In this case, the computer program may include a game app for a sports game. Each of steps 310 to 330 may be performed by the processor 220 in response to a code of the computer program. In some embodiments, at least one of steps 310 to 330 may be performed through communication with a server (e.g., the server 150 described with reference to FIG. 1) for providing a game service over the network 170 under the control of the computer program.

At step 310, the computer apparatus 200 may provide a customizing function which enables a user to generate a skill for a preset section by customizing at least one of the speed, trajectory and effect of a ball moving in the preset section in a sports game. For example, the sports game may include a baseball game. The preset section may include a section in which pitching and catching are performed between a pitcher and catcher in a baseball game. In this case, a user may generate the type of pitch having a desired speed, trajectory and/or effect. In other words, the user can posses a desired speed, trajectory and/or effect with respect to a given section. In this case, the given section may be variously set depending on a genre of a sports game. For example, in tennis, a section between a racket and the target point of a ball may be set as a given section. In volleyball, a section between a hand that spikes a ball and a target point may be set as a given section. In this case, a substantial section in which the ball moves in a game may be dynamically determined based on the place where a force is applied to the ball and the target point. The speed and trajectory of a ball set by a user may be relative values. For example, it is assumed that in a baseball game, the speed of a ball may be set in a form in which one of levels 1 to 5 is select. In this case, assuming that a level, that is, a criterion, is the level 3, the speed of a ball based on the level 3 may be different depending on a pitcher character that throws the ball. Furthermore, a change in the speed of a ball varying in each of the levels may be different depending on a pitcher character that throws the ball. As described above, the speed of a ball set by a user may be an absolute value in some embodiments, but may be a relative value based on the status of a character associated with a movement of the ball.

At step 320, the computer apparatus 200 may store at least one of the customized speed, trajectory and effect in association with the skill generated through the customizing function. In one embodiment, at least one of the customized speed, trajectory and effect may be stored in a local repository included in the computer apparatus 200. In another embodiment at least one of the customized speed, trajectory and effect may be stored in a server for providing a game service to the computer apparatus 200.

At step 330, the computer apparatus 200 may control a movement of the ball for the preset section using at least one of a speed, trajectory and effect stored in association with an activated skill in response to the activation of the skill for the section in a process in which a game instance for the sports game proceeds. If a corresponding section is a section (e.g., section between a pitcher and catcher in baseball) in which the place where a force is applied to a ball and a target point are the same or similar whenever a skill is used, the distance of the corresponding section may be always constant whenever the skill is activated (e.g., when the user uses the skill). In contrast, if a corresponding section is a section in which the place where a force is applied to a ball and a target point are changed, the distance of the corresponding section may vary whenever a skill is activated.

In one embodiment, at step 310, the computer apparatus 200 may provide a sector speed setting function for setting the speed of a ball with respect to each of a plurality of sectors split from the section. For example, the section may be split into N (e.g., 5) sectors regardless of the length of the section. For example, a function for setting the speed of a ball may be provided in each of the N sectors. In this case, the speed of the ball may be set in a form in which one of a preset number of levels is selected with respect to each of the N sectors. In this case, at step 320, the computer apparatus 200 may store the speed of a ball customized in each of a plurality of sectors in association with a skill. Thereafter, when the skill is activated in a process in which a game instance for a sports game proceeds, at step 330, the computer apparatus 200 may control the speed of a ball moving in the section based on the speed of the ball, set in each of the plurality of sectors, with respect to each of the plurality of sectors. For example, in the case of a baseball game, the computer apparatus 200 can provide the type of pitch in which the speed of a ball varies based on the setting of a user for each sector of a section.

In another embodiment, at step 310, the computer apparatus 200 may provide a trajectory setting function for setting the trajectory of the ball in the section. In one embodiment, the trajectory of a ball may be set based on an output value of a motion sensor included in the computer apparatus 200, but various embodiments are not limited thereto. For example, a method of directly drawing, by a user, the trajectory of a ball in a three-dimensional space or a method using other sensors, such as a gyro sensor, may be used. In this case, at step 320, the computer apparatus 200 may store the trajectory of the ball in association with a skill. Thereafter, when the skill is activated in a process in which a game instance for a sports game proceeds, at step 330, the computer apparatus 200 may control the trajectory of the ball moving in a corresponding section based on the trajectory set through the trajectory setting function. For example, in the case of a baseball game, the computer apparatus 200 can provide the type of pitch in which the trajectory of a ball varies based on the setting of a user.

In yet another embodiment, at step 310, the computer apparatus 200 may provide an effect selection function for selecting one of a plurality of effects fabricated in a preset form. An effect selected through the effect selection function may be stored in association with a generated skill. Thereafter, when the skill is activated in a process in which a game instance for a sports game proceeds, at step 330, the computer apparatus 200 may apply the effect, selected through the effect selection function, to the ball moving in a corresponding section. For example, in the case of a baseball game, a pitcher can throw a ball to which an effect set by a user has been applied.

Two or more of the speed, trajectory and effect of a ball may be controlled in a combined form. For example, at step 310, the computer apparatus 200 may provide a sector speed setting function for setting the speed of a ball with respect to each of a plurality of sectors split from the section and a trajectory setting function for setting the trajectory of the ball in the section. In this case, when the speed of the ball for each of the plurality of sectors is determined through the sector speed setting function, a total movement time of the ball for the corresponding section may be calculated based on the speed of the ball for each of the plurality of sectors. Furthermore, when the trajectory of the ball is set through the trajectory setting function, the trajectory of the ball may be divided into time zones each corresponding to a total movement time of the ball, and a change in the trajectory for each time zone may be set. In this case, the calculation of the total movement time of the ball or the setting of a change in the trajectory for each time zone may be performed by the computer apparatus 200. In some embodiments, the calculation of the total movement time or the setting of the change may be performed by a server for providing a game service to the computer apparatus 200. At step 330, when the skill is activated, the computer apparatus 200 may control a movement of the ball moving in the section based on a change in the trajectory for each time zone. It can be easily understood that both the speed of a ball and the trajectory of the ball for each sector, set by a user, have been incorporated into such a change in the trajectory for each time zone. It can also be easily understood that an effect set by a user is further incorporated into such a movement of a ball.

Furthermore, in some embodiments, the customizing function may include a preview function for displaying an image of a ball moving in a section based on at least one of the speed, trajectory and effect of the ball set through the customizing function. Accordingly, a user can preview a skill being generated by the user. In this case, the customizing function may further include a sharing function for capturing at least one of frames configuring an image displayed through the preview function and sharing the captured frame through a social network service. In this case, the trajectory of a ball moving in a section may be displayed in each of the frames. When the sharing function is executed, the computer apparatus 200 may select at least one of the frames based on the trajectory of the ball displayed in each of the frames. For example, the computer apparatus 200 may select a frame in which the entire trajectory of a ball based on a skill is well displayed so that the skill customized by a user is shared through a social network service.

Figure 4:
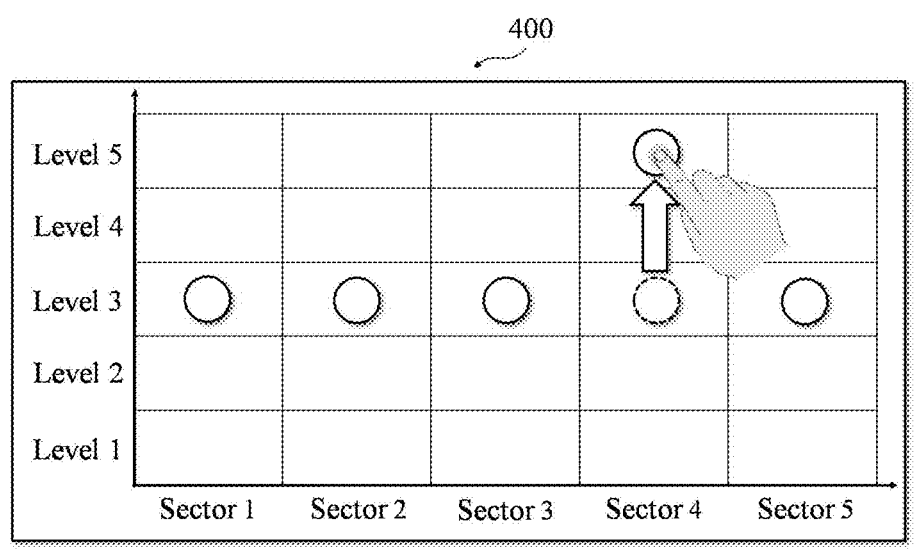
FIG. 4 is a diagram illustrating an example of a sector speed setting function in an embodiment of the present invention.

FIG. 4 is a diagram illustrating an example of the sector speed setting function in an embodiment of the present invention. FIG. 4 illustrates an example of a screen 400 on which the sector speed setting function has been displayed. The example of the screen 400 illustrates an example in which a section has been divided into five sectors 1 to 5 and the speed of a ball has been divided into five speeds of levels 1 to 5. In this case, the example of the screen 400 illustrates an example in which in a touch screen environment, a user changes the speed of a ball in the sector 4 from the level 3 to the level 5. As described above, the sector speed setting function may provide the function which enables a user to set the speed of a ball for each sector.

Figure 5:
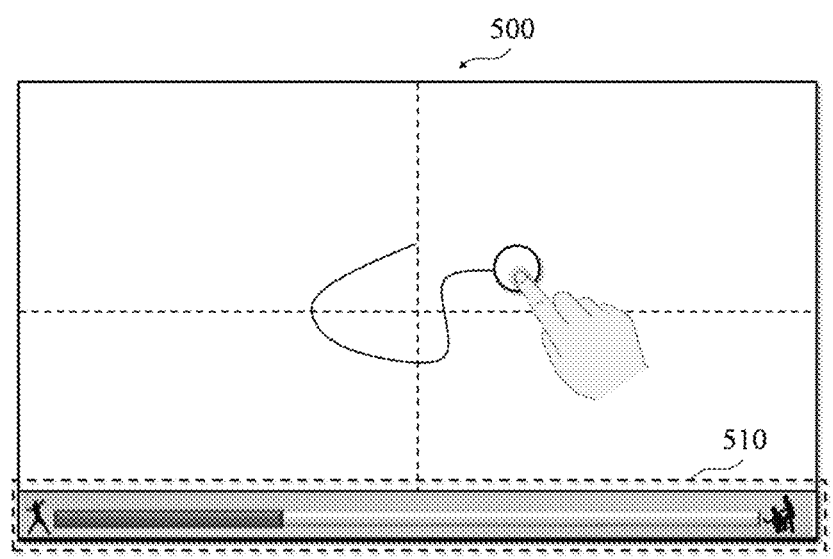
FIG. 5 is a diagram illustrating an example of a trajectory setting function in an embodiment of the present invention.

FIG. 5 is a diagram illustrating an example of the trajectory setting function in an embodiment of the present invention. FIG. 5 illustrates an example of a screen 500 on which the trajectory setting function has been displayed. The example of the screen 400 illustrates an example in which a user sets the trajectory of a ball by directly drawing the trajectory with a finger in a touch screen environment. In the example of the screen 500, the trajectory of a ball has been illustrated in a form to be drawn on a two-dimensional screen. In some embodiments, as in a dotted box 510, the trajectory of a ball may be drawn over time, and thus the three-dimensional trajectory of the ball is substantially set as the ball moves over time.

The embodiment of FIG. 5 illustrates an example in which the trajectory of a ball is set based on a touch in a touch screen environment. In some embodiments, the trajectory of a ball may be set based on an output value of a sensor (e.g., a motion sensor or a gyro sensor) included in the computer apparatus 200 over time.

Figure 6:
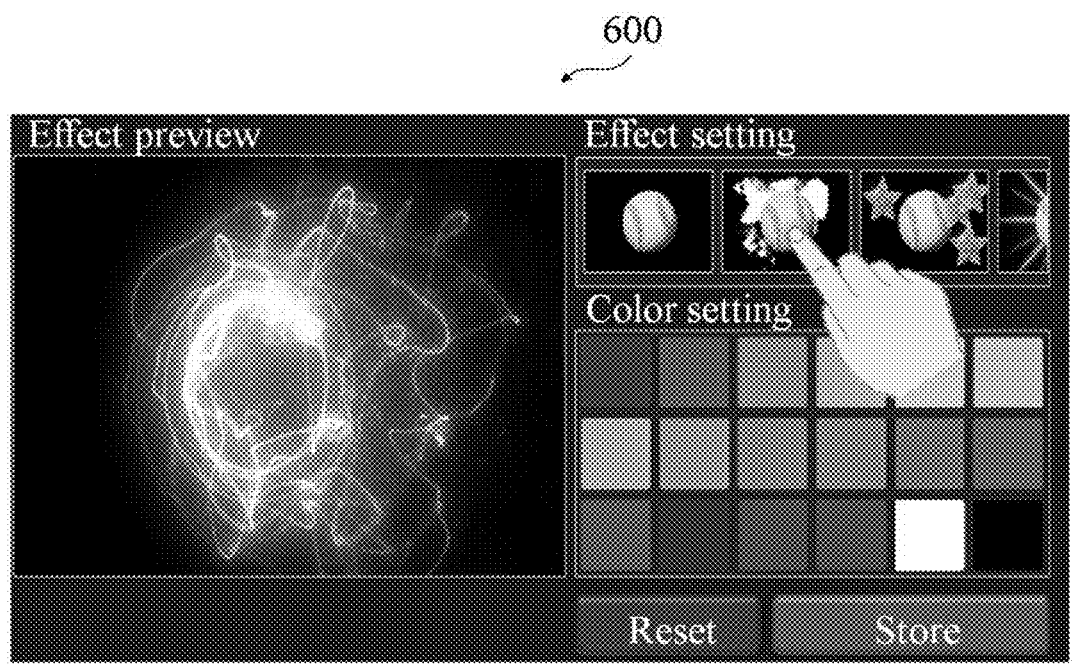
FIG. 6 is a diagram illustrating an example of an effect selection function in an embodiment of the present invention.

FIG. 6 is a diagram illustrating an example of the effect selection function in an embodiment of the present invention. FIG. 6 illustrates an example of a screen 600 on which the effect selection function has been displayed. A user may select a desired effect using a method of selecting one of the presets of a given effect. In this case, as illustrated in the example of the screen 600, the effect selection function may further include a function for an additional setting change for an effect, such as a color. Furthermore, the preview of an effect set by a user may be provided to the effect selection function.

Figure 7:
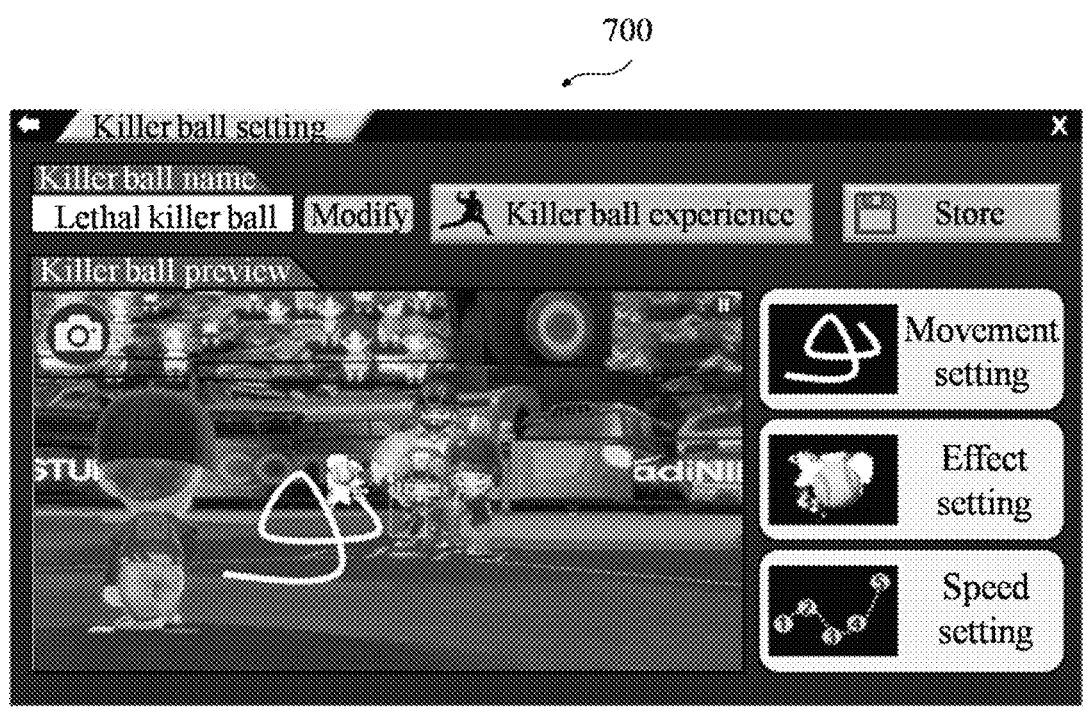
FIG. 7 is a diagram illustrating an example of an implementation of a customizing function in an embodiment of the present invention.

FIG. 7 is a diagram illustrating an example of an implementation of the customizing function in an embodiment of the present invention. FIG. 7 illustrates a screen implementation example 700 of the customizing function implemented in relation to a baseball game. In the screen implementation example 700, "movement setting" illustrates a user interface for providing the trajectory setting function described with reference to FIG. 5. "effect setting" illustrates a user interface for providing the effect selection function described with reference to FIG. 6. "speed setting" illustrates a user interface for providing the sector speed setting function described with reference to FIG. 4. "killer ball name" may mean the name of a skill generated by a user. Furthermore, "killer ball experience" may be a user interface for providing a game instance in which a user may directly use a skill being generated by the user. In this case, the user may test the skill from the viewpoint of a pitcher and/or from the viewpoint of a batter while switching between offense and defense. Furthermore, an image in which a skill being generated by a user is used may be repeatedly played back and displayed at pitcher timing in a "killer ball preview" region. In this case, the movement path of a ball may be displayed in the image in which the skill is used.

Figure 8:
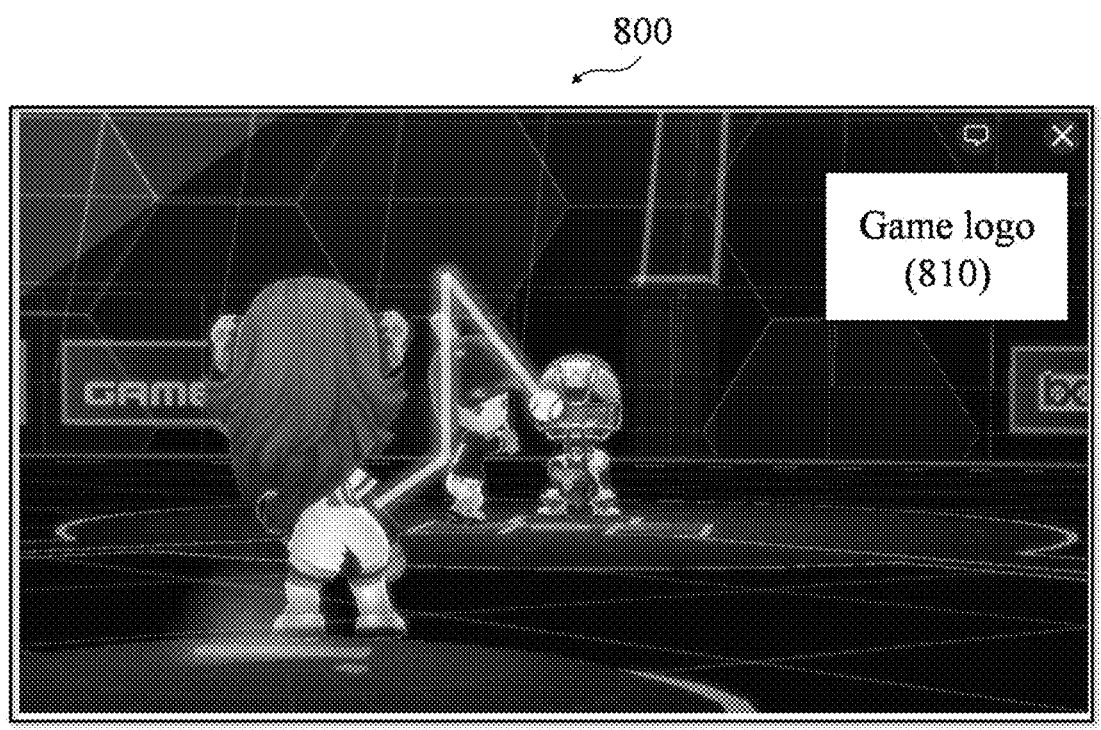
FIG. 8 is a diagram illustrating an example of a frame captured through a sharing function in an embodiment of the present invention.

FIG. 8 is a diagram illustrating an example of a frame captured through the sharing function in an embodiment of the present invention. As described above, the customizing function may further include the sharing function for capturing at least one of frames configuring an image displayed through the preview function and sharing the captured frame through a social network service. FIG. 8 illustrates an example 800 of a frame captured through the sharing function. In this case, a game logo 810 may be added to the captured frame.

Figure 9:
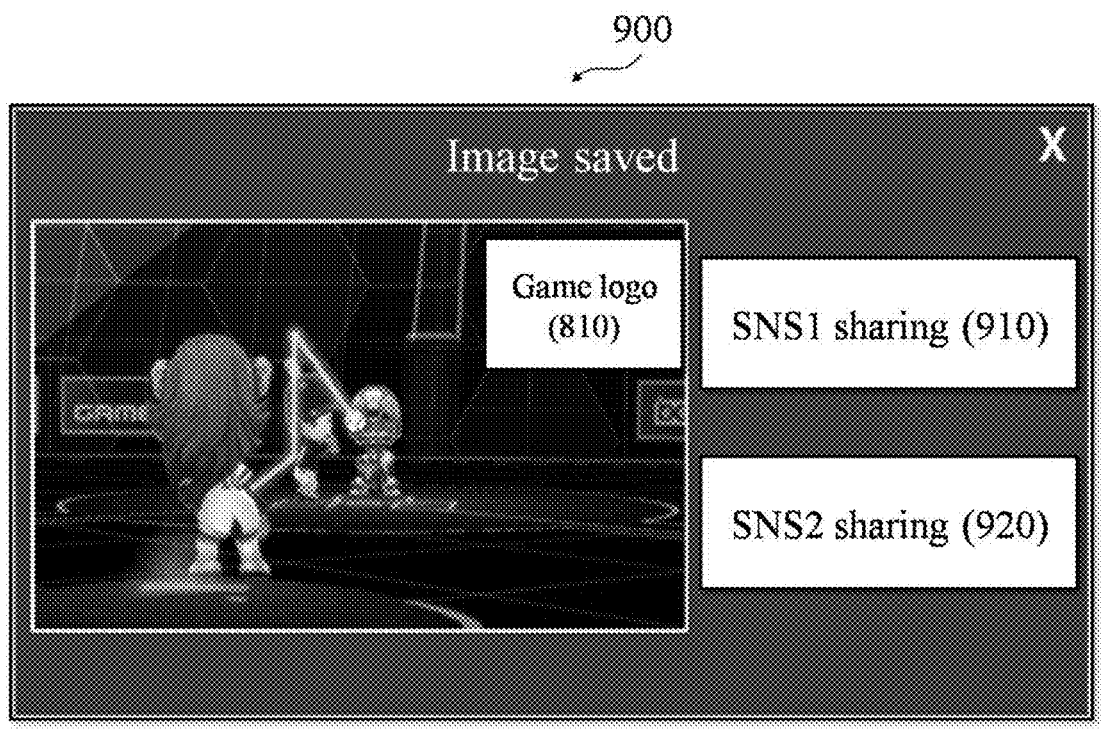
FIG. 9 is a diagram illustrating an example of the sharing of a captured frame in an embodiment of the present invention.

FIG. 9 is a diagram illustrating an example of the sharing of a captured frame in an embodiment of the present invention. In FIG. 9, a sharing example 900 illustrates an example in which functions 910 and 920 for sharing a captured frame through a social network service when the frame is captured have been displayed. A user may share a captured frame through a specific social network service using the functions 910 and 920.

The aforementioned system or apparatus may be implemented in the form of a hardware element or a combination of a hardware element and a software element. For example, the apparatus and components described in the embodiments may be implemented using one or more general-purpose computers or special-purpose computers, like a processor, a controller, an arithmetic logic unit (ALU), a digital signal processor, a microcomputer, a field programmable gate array (FPGA), a programmable logic unit (PLU), a microprocessor or any other device capable of executing or responding to an instruction. The processor may perform an operating system (OS) and one or more software applications executed on the OS. Furthermore, the processor may access, store, manipulate, process and generate data in response to the execution of software. For convenience of understanding, one processing device has been illustrated as being used, but a person having ordinary skill in the art may understand that the processor may include a plurality of processing elements and/or a plurality of types of processing elements. For example, the processor may include a plurality of processors or a single processor and a single controller. Furthermore, a different processing configuration, such as a parallel processor, is also possible.

Software may include a computer program, code, an instruction or a combination of one or more of them and may configure a processor so that it operates as desired or may instruct the processor independently or collectively. The software and/or data may be embodied in a machine, component, physical device, virtual equipment or computer storage medium or device of any type in order to be interpreted by the processor or to provide an instruction or data to the processor. The software may be distributed to computer systems connected over a network and may be stored or executed in a distributed manner. The software and data may be stored in one or more computer-readable recording media.

The method according to the embodiment may be implemented in the form of a program instruction executable by various computer means and stored in a computer-readable recording medium. The computer-readable recording medium may include a program instruction, a data file, and a data structure solely or in combination. The medium may continue to store a program executable by a computer or may temporarily store the program for execution or download. Furthermore, the medium may be various recording means or storage means of a form in which one or a plurality of pieces of hardware has been combined. The medium is not limited to a medium directly connected to a computer system, but may be one distributed over a network. An example of the medium may be one configured to store program instructions, including magnetic media such as a hard disk, a floppy disk and a magnetic tape, optical media such as CD-ROM and a DVD, magneto-optical media such as a floptical disk, ROM, RAM, and flash memory. Furthermore, other examples of the medium may include an app store in which apps are distributed, a site in which other various pieces of software are supplied or distributed, and recording media and/or store media managed in a server. Examples of the program instruction may include machine-language code, such as code written by a compiler, and high-level language code executable by a computer using an interpreter. The hardware apparatus may be configured to operate one or more software modules in order to perform an operation of an embodiment, and vice versa.

As described above, according to embodiments of the present invention, the function which enables a user to generate a skill for a preset section by customizing the speed, trajectory and/or effect of a ball moving in the preset section in a sports game can be provided. A movement of the ball in the preset section can be controlled based on the customized speed, trajectory and/or effect in response to the activation of the skill generated through the function when a sports game instance is performed.

As described above, although the embodiments have been described in connection with the limited embodiments and the drawings, those skilled in the art may modify and change the embodiments in various ways from the description. For example, proper results may be achieved although the aforementioned descriptions are performed in order different from that of the described method and/or the aforementioned elements, such as the system, configuration, device, and circuit, are coupled or combined in a form different from that of the described method or replaced or substituted with other elements or equivalents.

Accordingly, other implementations, other embodiments, and the equivalents of the claims belong to the scope of the claims.

What is claimed is:

1. A non-transitory processor-readable medium having instructions stored thereon, which when executed by one or more processors, cause the one or more processors to implement a control method, comprising:

providing a customizing function enabling a user to generate a skill for a preset section by customizing at least one of a speed, trajectory and effect of a ball moving in the preset section in a sports game;

storing at least one of the customized speed, trajectory and effect in association with the skill generated through the customizing function; and controlling a movement of the ball in the section using at least one of the speed, trajectory and effect stored in association with the activated skill in response to an activation of the skill for the section in a process in which a game instance for the sports game proceeds;

wherein providing the customizing function comprises providing a sector speed setting function for setting a speed of the ball in each of a plurality of sectors split from the section and a trajectory setting function for setting the trajectory of the ball in the section, wherein a total movement time of the ball in the section is calculated based on the speed of the ball in each of the plurality of sectors set through the sector speed setting function, wherein a change in the trajectory for each time zone is set by dividing the trajectory of the ball, set through the trajectory setting function, by each time zone corresponding to the total movement time of the ball, and wherein controlling the movement of the ball comprises controlling the movement of the ball in the section based on the change in the trajectory for each time zone in response to the activation of the skill.

2. The non-transitory processor-readable medium of claim 1, wherein:

controlling the movement of the ball comprises controlling, in each of the plurality of sectors, the speed of the ball moving in the section based on the speed of the ball in each of the plurality of sectors set through the sector speed setting function in response to the activation of the skill.

3. The non-transitory processor-readable medium of claim 1, wherein:

the trajectory setting function for setting the trajectory of the ball in the section uses an output value of a motion sensor included in the computer apparatus, and controlling the movement of the ball comprises controlling the trajectory of the ball moving in the section based on the trajectory set through the trajectory setting function in response to the activation of the skill.

4. The non-transitory processor-readable medium of claim 1, wherein:

the trajectory setting function for setting the trajectory of the ball in the section uses an input value of a touch screen included in the computer apparatus, and controlling the movement of the ball comprises controlling the trajectory of the ball moving in the section based on the trajectory set through the trajectory setting function in response to the activation of the skill.

5. The non-transitory processor-readable medium of claim 1, wherein:

providing the customizing function comprises providing an effect selection function for selecting one of a plurality of effects fabricated in a preset form, and controlling the movement of the ball comprises applying an effect, selected through the effect selection function, to the ball moving in the section in response to the activation of the skill.

6. The non-transitory processor-readable medium of claim 1, wherein:

the sports game comprises a baseball game, and the preset section comprises a section in which pitching and catching are performed between a pitcher and a catcher in the baseball game.

7. The non-transitory processor-readable medium of claim 1, wherein the customizing function comprises a preview function for displaying an image of the ball moving in the section based on at least one of the speed, trajectory and effect of the ball set through the customizing function.

8. The non-transitory processor-readable medium of claim 7, wherein:

the customizing function further comprises a sharing function for capturing at least one of frames configuring the image displayed through the preview function and sharing the captured frame through a social network service, a trajectory of the ball moving in the section is displayed in each of the frames, and the control method further comprises selecting the at least one of the frames based on the trajectories of the ball displayed in the frames when the sharing function is executed.

9. A control method performed by a computer apparatus comprising at least one processor, the control method comprising:

providing, by the at least one processor, a customizing function enabling a user to generate a skill for a preset section by customizing at least one of a speed, trajectory and effect of a ball moving in the preset section in a sports game;

storing, by the at least one processor, at least one of the customized speed, trajectory and effect in association with the skill generated through the customizing function; and controlling, by the at least one processor, a movement of the ball in the section using at least one of the speed, trajectory and effect stored in association with the activated skill in response to an activation of the skill for the section in a process in which a game instance for the sports game proceeds;

wherein providing the customizing function comprises providing a sector speed setting function for setting a speed of the ball in each of a plurality of sectors split from the section and a trajectory setting function for setting the trajectory of the ball in the section, wherein a total movement time of the ball in the section is calculated based on the speed of the ball in each of the plurality of sectors set through the sector speed setting function, wherein a change in the trajectory for each time zone is set by dividing the trajectory of the ball, set through the trajectory setting function, by each time zone corresponding to the total movement time of the ball, and wherein controlling the movement of the ball comprises controlling the movement of the ball in the section based on the change in the trajectory for each time zone in response to the activation of the skill.

10. A non-transitory processor-readable medium having instructions stored thereon, which when executed by one or more processors, cause the one or more processors to implement a control method, comprising:

providing a customizing function enabling a user to generate a skill for a preset section by customizing at least one of a speed, trajectory and effect of a ball moving in the preset section in a sports game;

storing at least one of the customized speed, trajectory and effect in association with the skill generated through the customizing function; and controlling a movement of the ball in the section using at least one of the speed, trajectory and effect stored in association with the activated skill in response to an activation of the skill for the section in a process in which a game instance for the sports game proceeds;

wherein the customizing function comprises a preview function enabling displaying an image of the ball moving in the section based on at least one of the speed, trajectory and effect of the ball set through the customizing function.

11. The non-transitory processor-readable medium of claim 10, wherein:

providing the customizing function comprises providing a sector speed setting function for setting a speed of the ball in each of a plurality of sectors split from the section, and controlling the movement of the ball comprises controlling, in each of the plurality of sectors, the speed of the ball moving in the section based on the speed of the ball in each of the plurality of sectors set through the sector speed setting function in response to the activation of the skill.

12. The non-transitory processor-readable medium of claim 10, wherein:

providing the customizing function comprises providing a trajectory setting function for setting the trajectory of the ball in the section based on an output value of a motion sensor included in the computer apparatus, and controlling the movement of the ball comprises controlling the trajectory of the ball moving in the section based on the trajectory set through the trajectory setting function in response to the activation of the skill.

13. The non-transitory processor-readable medium of claim 10, wherein:

providing the customizing function comprises providing a trajectory setting function for setting the trajectory of the ball in the section based on an input value of a touch screen included in the computer apparatus, and controlling the movement of the ball comprises controlling the trajectory of the ball moving in the section based on the trajectory set through the trajectory setting function in response to the activation of the skill.

14. The non-transitory processor-readable medium of claim 10, wherein:

providing the customizing function comprises providing an effect selection function for selecting one of a plurality of effects fabricated in a preset form, and controlling the movement of the ball comprises applying an effect, selected through the effect selection function, to the ball moving in the section in response to the activation of the skill.

15. The non-transitory processor-readable medium of claim 10, wherein:

the sports game comprises a baseball game, and the preset section comprises a section in which pitching and catching are performed between a pitcher and a catcher in the baseball game.

16. The non-transitory processor-readable medium of claim 10, wherein:

the customizing function further comprises a sharing function for capturing at least one of frames configuring the image displayed through the preview function and sharing the captured frame through a social network service, a trajectory of the ball moving in the section is displayed in each of the frames, and the control method further comprises selecting the at least one of the frames based on the trajectories of the ball displayed in the frames when the sharing function is executed.

* * * * *